United States Patent
Chen et al.

(10) Patent No.: US 11,520,403 B2
(45) Date of Patent: Dec. 6, 2022

(54) WIRELESS CONTROL DEVICE

(71) Applicant: ASUSTeK COMPUTER INC., Taipei (TW)

(72) Inventors: Po-Ting Chen, Taipei (TW); Po-Yin Lai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/519,618

(22) Filed: Nov. 5, 2021

(65) Prior Publication Data

US 2022/0155864 A1 May 19, 2022

(30) Foreign Application Priority Data

Nov. 18, 2020 (TW) ................................ 109140409

(51) Int. Cl.
| | |
|---|---|
| G06F 3/01 | (2006.01) |
| G06F 3/0346 | (2013.01) |
| G06F 3/041 | (2006.01) |
| G06T 19/00 | (2011.01) |
| H04W 4/80 | (2018.01) |

(52) U.S. Cl.
CPC ............ *G06F 3/014* (2013.01); *G06F 3/0346* (2013.01); *G06F 3/041* (2013.01); *G06T 19/006* (2013.01); *H04W 4/80* (2018.02); *G06F 2203/0331* (2013.01); *G06F 2203/04102* (2013.01); *G06F 2203/04105* (2013.01)

(58) Field of Classification Search
CPC ........ G06F 3/014; G06F 3/0346; G06F 3/041; G06F 2203/0331; G06F 2203/04102; G06F 2203/04105; G06T 19/006; H04W 4/80
See application file for complete search history.

(56) References Cited

U.S. PATENT DOCUMENTS

| | | | |
|---|---|---|---|
| 9,880,619 B2* | 1/2018 | Parham | G06F 3/014 |
| 9,971,404 B2* | 5/2018 | Messingher | G06F 3/0346 |
| 10,019,059 B2 | 7/2018 | Messingher et al. | |
| 11,144,121 B2* | 10/2021 | Wang | G06F 3/0346 |
| 2016/0313798 A1 | 10/2016 | Connor | |

FOREIGN PATENT DOCUMENTS

| | | |
|---|---|---|
| CN | 106484117 A | 3/2017 |
| CN | 206532244 U | 9/2017 |
| CN | 107679435 A | 2/2018 |
| CN | 106575159 B | 8/2019 |

* cited by examiner

*Primary Examiner* — Koosha Sharifi-Tafreshi
(74) *Attorney, Agent, or Firm* — McClure, Qualey & Rodack, LLP

(57) ABSTRACT

The disclosure provides a wireless control device adapted with an augmented reality device. The wireless control device includes a first finger sleeve and a pressure sensor, a first flexible electronic sensor, a first communication module, a first processor, and a first battery module located therein. The pressure sensor is configured to generate a connection signal in response to a touch pressure, and the first processor is configured to wake up a connection between the first communication module and the augmented reality device according to the connection signal. The first flexible electronic sensor is configured to generate a first sensing signal in response to a first control action, and the first processor is configured to generate a first control signal according to the first sensing signal and transmits the first control signal by using the first communication module to control the augmented reality device.

17 Claims, 5 Drawing Sheets

US 11,520,403 B2

WIRELESS CONTROL DEVICE

CROSS-REFERENCE TO RELATED APPLICATION

This application claims the priority benefit of Taiwan Application Serial No. 109140409, filed on Nov. 18, 2020. The entirety of the above-mentioned patent application is hereby incorporated by reference herein and made a part of specification.

BACKGROUND OF THE INVENTION

Field of the Invention

The disclosure relates to a wireless control device.

Description of the Related Art

Existing augmented reality devices are usually controlled wiredly or wirelessly. When an augmented reality device is connected to a controller by a physical cable, the movement of the users will be limited by the physical cable during use. Although the physical cable can be fixed onto clothes or be placed in a specific location while using, when a user moves in a wide range or intensively, he/she might be enmeshed by the cable connected between the controller and the augmented reality device, which causes dangerous or damages the devices. In addition, a wireless augmented reality device is currently controlled by manners of image vision and image recognition gestures. However, a premise for achieving effective control in such a manner is to ensure that the augmented reality device recognizes a gesture by hand correctly. As the augmented reality devices are expected to be widely used in life in the future, neither wired nor wireless augmented reality device is not easy for a user who is holding an object in hands or who is walking on the road.

BRIEF SUMMARY OF THE INVENTION

According to an aspect of the disclosure, a wireless control device configured for pairing with an augmented reality device is provided. The wireless control device includes a first finger sleeve, a pressure sensor, a first flexible electronic sensor, a first communication module, a first processor, and a first battery. The pressure sensor is located in the first finger sleeve and is configured to generate a connection signal in response to a touch pressure. The first flexible electronic sensor is located in the first finger sleeve and is configured to generate a first sensing signal in response to a first control action. The first communication module is located in the first finger sleeve and is configured to be connected to the augmented reality device. The first processor is located in the first finger sleeve and is electrically connected to the pressure sensor, the first flexible electronic sensor, and the first communication module, where the first processor is configured to wake up a connection between the first communication module and the augmented reality device according to the connection signal, and the first processor is configured to generate a first control signal according to the first sensing signal and transmits the first control signal by the first communication module, to control the augmented reality device; The first battery module is located in the first finger sleeve and is electrically connected to the first processor to provide required power.

In conclusion, in the disclosure, the flexible electronic sensors generate different outputs according to different actions to correspondingly control various functions without gestures recognition cameras, thereby reducing algorithm development costs. Therefore, the wireless control device of the disclosure provides an efficient and convenient control manner, which significantly alleviates inconvenience of controlling current augmented reality devices by users, so that the augmented reality devices are more conveniently used.

DETAILED DESCRIPTION OF THE EMBODIMENTS

Figure 1:
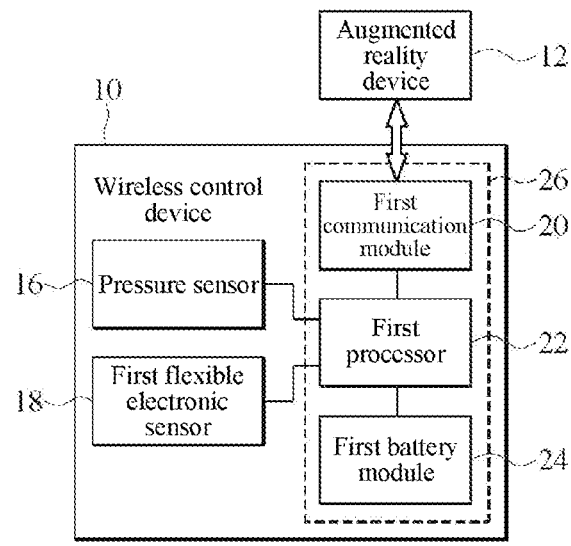
FIG. 1 is a schematic block diagram of a wireless control device according to an embodiment of the disclosure.
Figure 2:
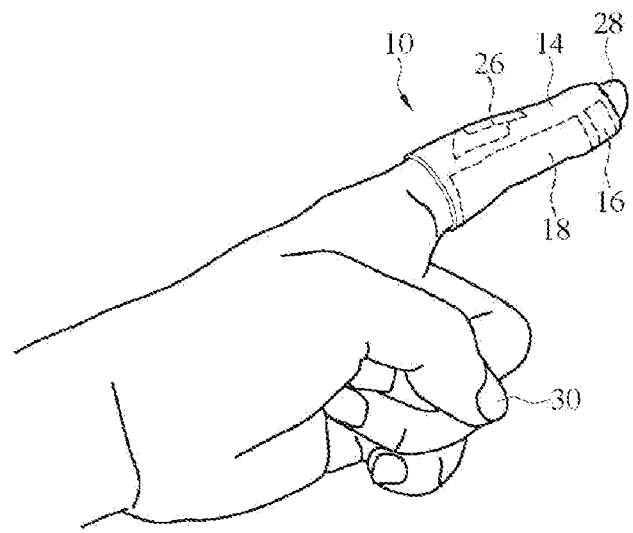
FIG. 2 is a schematic outside view of the wireless control device according to an embodiment of the disclosure.

Referring to FIG. 1 and FIG. 2 together, a wireless control device 10 is adapted to pair with an augmented reality device 12. The wireless control device 10 includes a first finger sleeve 14, a pressure sensor 16, a first flexible electronic sensor 18, a first communication module 20, a first processor 22, and a first battery module 24. In an embodiment, the first finger sleeve 14 of the wireless control device 10 is configured to be sleeved on an index finger 28 of a user, and controlled with a thumb 30. In an embodiment, the pressure sensor 16, the first flexible electronic sensor 18, the first communication module 20, the first processor 22, and the first battery module 24 are equipped in the first finger sleeve 14. The pressure sensor 16 is close to a fingertip of the index finger 28 of the user. The first processor 22 is electrically connected to the pressure sensor 16, the first flexible electronic sensor 18, the first communication module 20, and the first battery module 24. The first communication module 20 is configured to be connected to the augmented reality device 12. The pressure sensor 16 generates a connection signal in response to a touch pressure, so that the first processor 22 wakes up a connection between the first communication module 20 and the augmented reality device 12 according to the connection signal. The first flexible electronic sensor 18 generates a first sensing signal in response to a first control action, so that the first processor 22 generates a first control signal according to the first sensing signal and transmits the first control signal by the first communication module 20, to control the augmented reality device 12. The first battery module 24 provides power required for the foregoing elements.

In an embodiment, the first processor 22, the first communication module 20, and the first battery module 24 are integrated into a single microchip 26 and disposed in the first finger sleeve 14. In an embodiment, the first flexible electronic sensor 18 is a flexible resistive bending sensor or a flexible resistive pressure sensor. When the first flexible electronic sensor 18 is a flexible resistive bending sensor, the first control action is a bending action, so as to control different functions by using different bending degrees and bending positions, including up, down, left, right, confirm, and the like commands. When the first flexible electronic sensor 18 is a flexible resistive pressure sensor, the first control action is to move a thumb up, down, left, and right on a surface of the flexible resistive pressure sensor to control different functions. A larger pressure applied by the thumb on the surface of the flexible resistive pressure sensor indicates a larger resistance value. Corresponding functions are determined by using a digital distribution and magnitudes of resistance values at the different positions.

Figure 3:
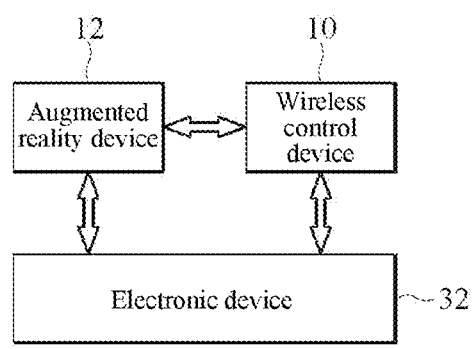
FIG. 3 is a schematic block diagram of a wireless control device and an electronic device and an augmented reality device paired with the wireless control device according to an embodiment of the disclosure.

In an embodiment, the first communication module 20 is a Bluetooth wireless module for signal communication with the augmented reality device 12 by using a Bluetooth transmission technology. Before communicate with the Bluetooth transmission technology, the wireless control device 10 needs to pair the augmented reality device 12. The augmented reality device 12 searches by an implemented application (APP) for a Bluetooth serial number of the wireless control device 10 and performing pairing for a subsequent connection. In this embodiment, the first control signal generated by the first processor 22 is transmitted to the augmented reality device 12 by the first communication module 20, to control the augmented reality device 12. Referring to FIG. 1 to FIG. 3, when the augmented reality device 12 does not include an implemented application (APP), an electronic device 32 that implements with the APP is required for assisting the pairing between the augmented reality device 12 and the wireless control device 10. The electronic device 32 searches for the Bluetooth serial number of the wireless control device 10 and a Bluetooth serial number of the augmented reality device 12 for paring, so that the electronic device 32, the wireless control device 10, and the augmented reality device 12 are paired for a subsequent connection. In this embodiment, the first control signal generated by the first processor 22 is transmitted to the augmented reality device 12 or the electronic device 32 by the first communication module 20, and the electronic device 32 transmits the signal to the augmented reality device 12 to control the augmented reality device 12. In an embodiment, the electronic device 32 is a notebook computer, a mobile phone, a personal digital assistant (PDA), a tablet computer, a desktop computer, or the like. In other embodiments, the first communication module 20 is a Zig-Bee communication module or a Wi-Fi communication module.

Figure 4:
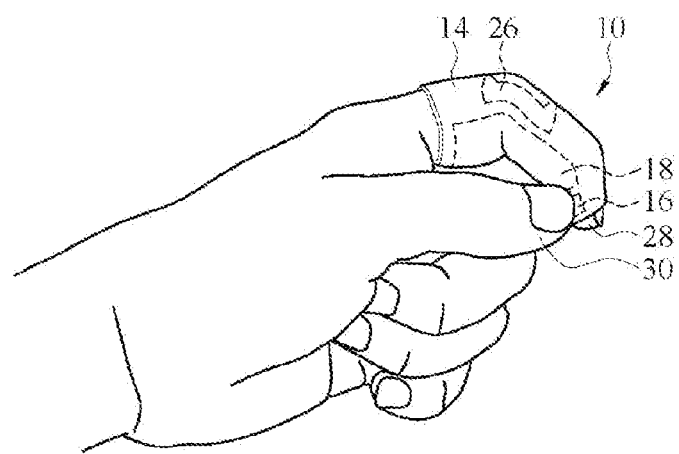
FIG. 4 is a schematic action diagram of waking up a connection by the wireless control device according to an embodiment of the disclosure.
Figure 5:
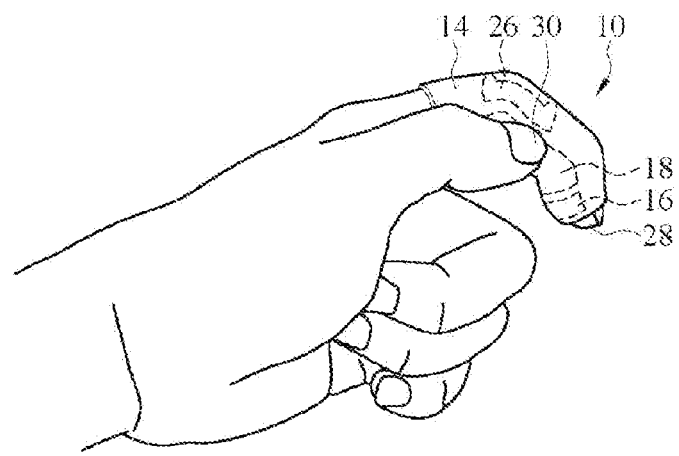
FIG. 5 is a schematic action diagram showing control of the wireless control device according to an embodiment of the disclosure.

Referring to FIG. 1, FIG. 4, and FIG. 5, when the wireless control device 10 is paired and the user sleeves the first finger sleeve 14 on the index finger 28, wears the augmented reality device 12, and applies a touch pressure on the pressure sensor 16 with the thumb 30, the pressure sensor 16 generates a connection signal in response to the touch pressure and transmits the connection signal to the first processor 22, and the first processor 22 wakes up a connection between the first communication module 20 and the augmented reality device 12 according to the connection signal. When user performs a first control action (including up, down, left, and right movement) on the surface of the first flexible electronic sensor 18 (the flexible resistive pressure sensor is exemplified herein) with the thumb 30. As shown in FIG. 5, the first flexible electronic sensor 18 generates a first sensing signal in response to the first control action and transmits the first sensing signal to the first processor 22. The first processor 22 generates a first control signal according to the first sensing signal and transmits the first control signal to the augmented reality device 12 by the first communication module 20, to control the augmented reality device 12 to perform corresponding functions.

Figure 6:
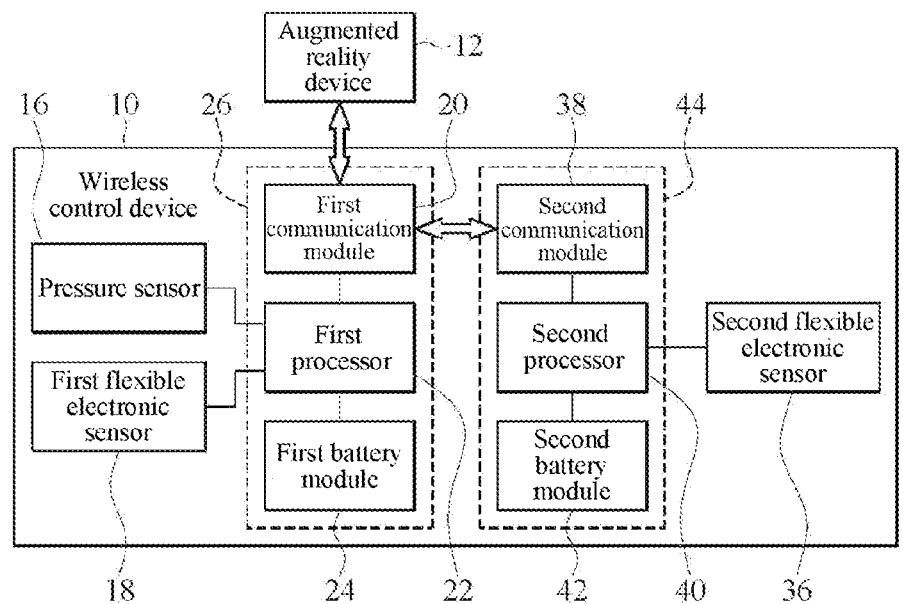
FIG. 6 is a schematic block diagram of a wireless control device according to another embodiment of the disclosure.
Figure 7:
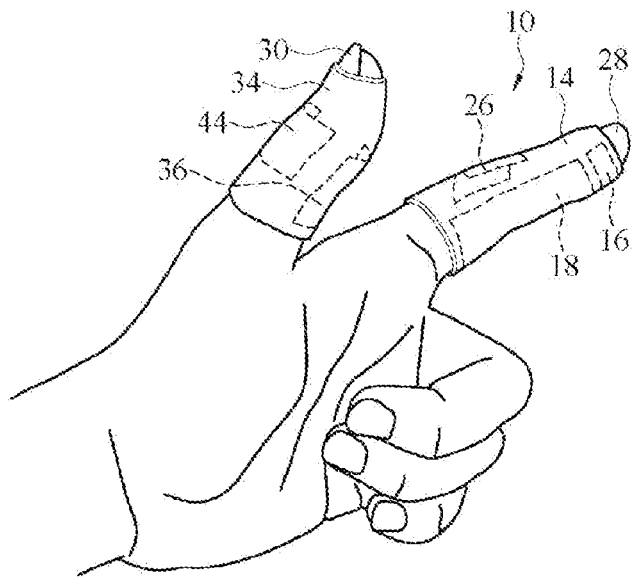
FIG. 7 is a schematic outside view of the wireless control device according to another embodiment of the disclosure.

Referring to FIG. 6 and FIG. 7 together, in addition to the first finger sleeve 14, the pressure sensor 16, the first flexible electronic sensor 18, the first communication module 20, the first processor 22, and the first battery module 24, the wireless control device 10 further includes a second finger sleeve 34, a second flexible electronic sensor 36, a second communication module 38, a second processor 40, and a second battery module 42. In the wireless control device 10, the first finger sleeve 14 is sleeved on the index finger 28 of the user to perform control by the first finger sleeve 14, and the pressure sensor 16 is adjacent to a fingertip of the index finger 28. Other structures are the same as those in the embodiment shown in FIG. 2, and therefore details are not described herein again. The second finger sleeve 34 is sleeved on the thumb 30 of the user to perform control by the second finger sleeve 34. The second flexible electronic sensor 36, the second communication module 38, the second processor 40, and the second battery module 42 are located in the second finger sleeve 34. The second processor 40 is electrically connected to the second flexible electronic sensor 36, the second communication module 38, and the second battery module 42. Since the wireless control device 10 includes both the first processor 22 and the second processor 40, the first processor 22 is set as a master controller, and the second processor 40 is set as a slave processor. The second communication module 38 is configured to be connected to the first communication module 20. When the pressure sensor 16 generates the connection signal in response to the touch pressure, the first processor 22 wakes up the connection between the first communication module 20 and the augmented reality device 12 and the connection between the first communication module 20 and the second communication module 38. The second flexible electronic sensor 36 generates a second sensing signal in response to a second control action, so that the second processor 40 generates a second control signal according to the second sensing signal and transmits the second control signal to the first processor 22 by the second communication module 38 and the first communication module 20, and the first processor 22 transmits the second control signal by the first communication module 20, to control the augmented reality device 12. The second battery module 42 provides power required for the foregoing elements.

In an embodiment, the first processor 22, the first communication module 20, and the first battery module 24 are integrated into a single microchip 26 and are disposed in the first finger sleeve 14, and the second processor 40, the second communication module 38, and the second battery module 42 are also integrated into a single microchip 44 and are disposed in the second finger sleeve 34.

In an embodiment, the first flexible electronic sensor 18 and the second flexible electronic sensor 36 are flexible resistive bending sensors or flexible resistive pressure sensors. In an embodiment, the first flexible electronic sensor 18 and the second flexible electronic sensor 36 each are flexible resistive bending sensors or flexible resistive pressure sensors. Alternatively, one of the first flexible electronic sensor and the second flexible electronic sensor is a flexible resistive bending sensor, and the other is a flexible resistive pressure sensor. The first flexible electronic sensor and the second flexible electronic sensor are used in combination according to an actual situation. In an embodiment, the first flexible electronic sensor 18 and the second flexible electronic sensor 36 each are a flexible resistive pressure sensor. Since the first finger sleeve 14 is sleeved on the index finger 28 of the user and the second finger sleeve 34 is sleeved on the thumb 30, the user performs the first control action on the first flexible electronic sensor 18 on the index finger 28 by the thumb 30, or performs the second control action on the second flexible electronic sensor 36 on the thumb 30 by the index finger 28. The first sensing signal generated by the first flexible electronic sensor 18 in response to the first control action and the second sensing signal generated by the second flexible electronic sensor 36 in response to the second control action represent different functions. Therefore, the first control signal generated by the first processor 22 according to the first sensing signal and the second control signal generated by the second processor 40 according to the second sensing signal are used to control different functions. In this way, the wireless control device 10 performs more control actions to generate more control signals to control various functions.

In an embodiment, the first communication module 20 and the second communication module 38 are Bluetooth wireless modules, so that the first communication module 20 communicates with the augmented reality device 12 by the Bluetooth transmission technology and the first communication module 20 communicates with the second communication module 38 by the Bluetooth transmission technology. Bluetooth pairing details are also the same as those in the foregoing embodiment, and therefore details are not described herein again. In other embodiments, the first communication module 20 and the second communication module 38 are ZigBee communication modules or Wi-Fi communication modules.

Figure 8:
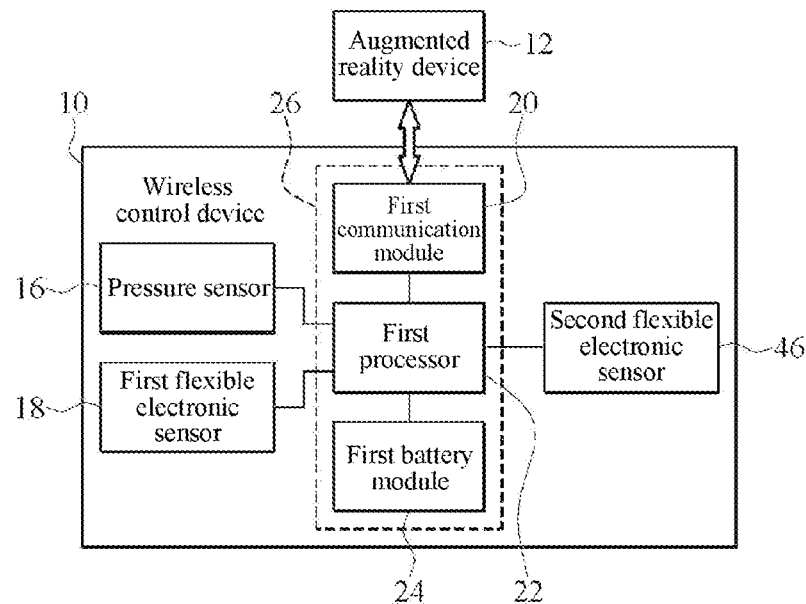
FIG. 8 is a schematic block diagram of the wireless control device according to still another embodiment of the disclosure.
Figure 9:
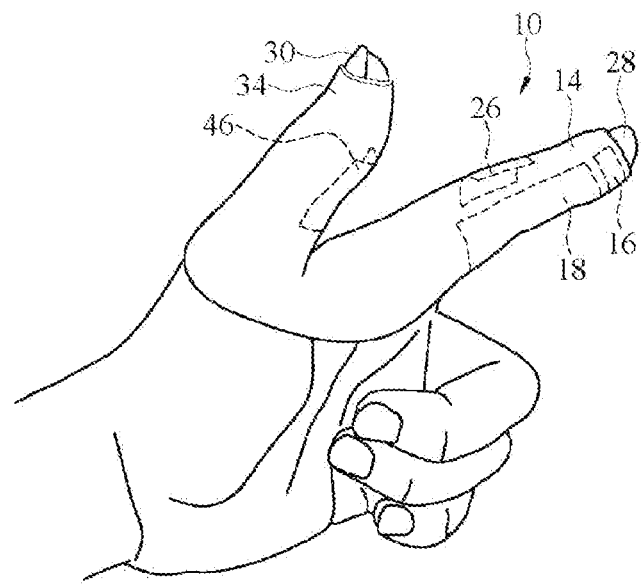
FIG. 9 is a schematic outside view of the wireless control device according to yet embodiment of the disclosure.

Referring to FIG. 8 and FIG. 9, in addition to the first finger sleeve 14, the pressure sensor 16, the first flexible electronic sensor 18, the first communication module 20, the first processor 22, and the first battery module 24, the wireless control device 10 further includes a second finger sleeve 34 and a second flexible electronic sensor 46. The second finger sleeve 34 is connected to the first finger sleeve 14, and the second flexible electronic sensor 46 is located in the second finger sleeve 34 and is electronically connected to the first processor 22, so that the first flexible electronic sensor 18 and the second flexible electronic sensor 46 are jointly electrically connected to the first processor 22, to share the first communication module 20, the first processor 22, and the first battery module 24. The first finger sleeve 14 is sleeved on the index finger 28 of the user to perform control by the first flexible electronic sensor 18 in the first finger sleeve 14, and the pressure sensor 16 is located on the index finger 28 on the fingertip. The second finger sleeve 34 is sleeved on the thumb 30 to perform control by the second flexible electronic sensor 46 in the second finger sleeve 34. The first flexible electronic sensor 18 generates a first sensing signal in response to the first control action, or the second flexible electronic sensor 46 generates a second sensing signal in response to the second control action. Since the first flexible electronic sensor 18 and the second flexible electronic sensor 46 share the first processor 22, the first sensing signal and the second sensing signal are both transmitted to the first processor 22. The first processor 22 generates a corresponding first control signal or second control signal according to the first sensing signal or the second sensing signal, and transmits the first control signal or the second control signal to the augmented reality device 12 by the first communication module 20, to control the augmented reality device 12.

In an embodiment, the first flexible electronic sensor 18 and the second flexible electronic sensor 46 are also selectively a flexible resistive bending sensor or a flexible resistive pressure sensor.

The foregoing embodiments are described by using an example in which the first finger sleeve is sleeved on the index finger and the second finger sleeve is sleeved on the thumb. In other embodiments, the first finger sleeve is sleeved on the thumb, and the second finger sleeve is sleeved on the index finger. The first finger sleeve and the second finger sleeve are sleeved on any habitual finger of the user provided that the user conveniently performs operations.

Based on the above, compared with the conventional augmented reality device and controller connected wiredly, the wireless control device of the disclosure is smaller volume, requires no physical wires, and is easily loaded. Compared with a wireless augmented reality device controlled by means of image recognition, the wireless control device disclosed here does not require gesture recognition, reduces algorithm development costs, and avoids a gesture recognition failure.

In conclusion, in the disclosure, the flexible electronic sensors generate different outputs according to different actions to correspondingly control various functions without a need of recognition by augmented reality devices, thereby reducing algorithm development costs. Therefore, the wireless control device of the disclosure is efficient and convenient to control, and significantly alleviates inconvenience of controlling existing augmented reality devices by users, so that the augmented reality devices are more conveniently used.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. A wireless control device, adapted with an augmented reality device, the wireless control device comprising:
   a first finger sleeve;
   a pressure sensor, located in the first finger sleeve and configured to generate a connection signal in response to a touch pressure;
   a first flexible electronic sensor, located in the first finger sleeve and configured to generate a first sensing signal in response to a first control action;
   a first communication module, located in the first finger sleeve and configured to be connected to the augmented reality device;
   a first processor, located in the first finger sleeve and electrically connected to the pressure sensor, the first flexible electronic sensor, and the first communication module, wherein the first processor is configured to wake up a connection between the first communication module and the augmented reality device according to the connection signal, and the first processor is configured to generate a first control signal according to the first sensing signal and transmit the first control signal by the first communication module, to control the augmented reality device; and a first battery module, located in the first finger sleeve and electrically connected to the first processor to provide power.

2. The wireless control device according to claim 1, wherein the first flexible electronic sensor is a flexible resistive bending sensor or a flexible resistive pressure sensor.

3. The wireless control device according to claim 1, wherein the first processor, the first communication module, and the first battery module are integrated into a single microchip.

4. The wireless control device according to claim 1, wherein the first communication module is a Bluetooth wireless module, a ZigBee communication module, or a Wi-Fi communication module.

5. The wireless control device according to claim 1, wherein the first control signal is transmitted to the augmented reality device by the first communication module.

6. The wireless control device according to claim 1, further comprising:
   a second finger sleeve;
   a second flexible electronic sensor, located in the second finger sleeve and configured to generate a second sensing signal in response to a second control action;
   a second communication module, located in the second finger sleeve and connected to the first communication module by using a signal;
   a second processor, located in the second finger sleeve and electrically connected to the second flexible electronic sensor and the second communication module, wherein the second processor is configured to generate a second control signal according to the second sensing signal and transmit the second control signal to the first processor by the second communication module and the first communication module, and the first processor transmits the second control signal by the first communication module, to control the augmented reality device; and
   a second battery module, located in the second finger sleeve and electrically connected to the second processor to provide required power.

7. The wireless control device according to claim 6, wherein the first flexible electronic sensor and the second flexible electronic sensor are flexible resistive bending sensors or flexible resistive pressure sensors.

8. The wireless control device according to claim 6, wherein the second processor, the second communication module, and the second battery module are integrated into a single microchip.

9. The wireless control device according to claim 6, wherein the first communication module and the second communication module are Bluetooth wireless modules, ZigBee communication modules, or Wi-Fi communication modules.

10. The wireless control device according to claim 6, wherein the first control signal or the second control signal is transmitted to the augmented reality device by the first communication module.

11. The wireless control device according to claim 1, further comprising:
    a second finger sleeve, connected to the first finger sleeve; and
    a second flexible electronic sensor, located in the second finger sleeve and electrically connected to the first processor, wherein the second flexible electronic sensor is configured to generate a second sensing signal in response to a second control action and transmit the second sensing signal to the first processor, and the first processor is configured to generate a second control signal according to the second sensing signal and transmit the second control signal by the first communication module, to control the augmented reality device.

12. The wireless control device according to claim 11, wherein the first flexible electronic sensor and the second flexible electronic sensor are flexible resistive bending sensors or flexible resistive pressure sensors.

13. The wireless control device according to claim 11, wherein the first control signal or the second control signal is transmitted to the augmented reality device by the first communication module.

14. The wireless control device according to claim 1, wherein the augmented reality device is wirelessly connected with the wireless control device by an electronic device.

15. The wireless control device according to claim 14, wherein the first control signal is transmitted to the electronic device by the first communication module, and then the first control signal is transmitted to the augmented reality device by the electronic device.

16. The wireless control device according to claim 6, wherein the augmented reality device is wirelessly connected with the wireless control device by an electronic device.

17. The wireless control device according to claim 16, wherein the first control signal or the second control signal is transmitted to the electronic device by the first communication module, and then the first control signal or the second control signal is transmitted to the augmented reality device by using the electronic device.

* * * * *